Aug. 27, 1957  P. B. HARRIS  2,804,579
SAFETY SWITCH CONTROL FOR THREE-PHASE ELECTRIC MOTOR
Filed July 29, 1955
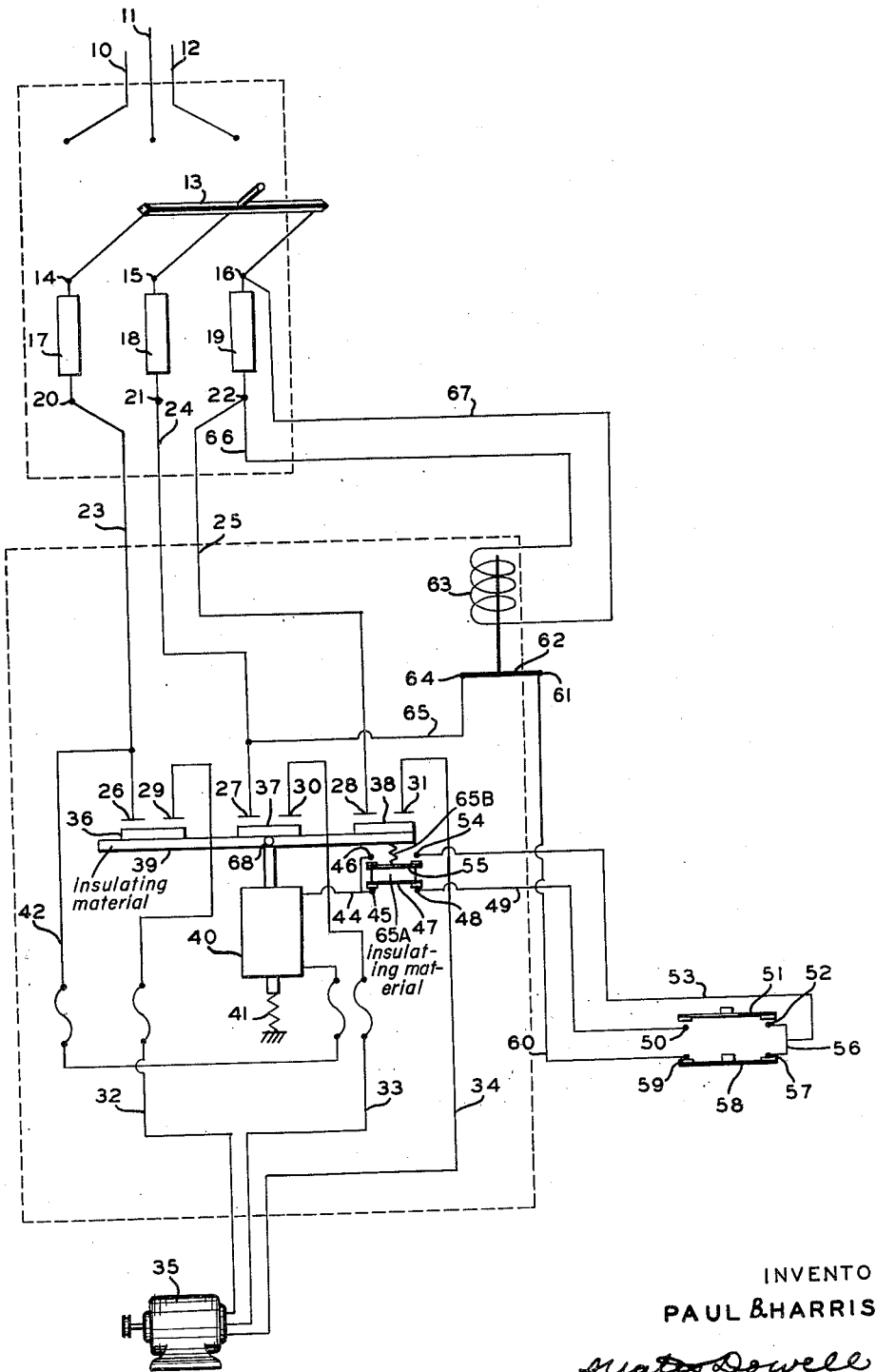
INVENTOR
PAUL B. HARRIS
BY
ATTORNEYS

United States Patent Office 2,804,579
Patented Aug. 27, 1957

2,804,579

SAFETY SWITCH CONTROL FOR THREE-PHASE ELECTRIC MOTOR

Paul B. Harris, Nashville, Tenn.

Application July 29, 1955, Serial No. 525,249

4 Claims. (Cl. 317—46)

The present invention relates to a safety control system particularly useful in controlling the supply of power to a three-phase electrical motor.

Heretofore, it has been conventional to provide a fuse in each line of a three-phase circuit to protect against overloads, but frequently one fuse would burn out and the motor would run on a single-phase through the other two fuses. Excessive overloads would be put on the single-phase operation of the motor so that the motor would frequently be burned out when one fuse was blown.

It is an object of the present invention to overcome the defects of the prior art and to provide a control circuit which immediately opens the circuit through each line of a three-phase supply when a fuse blows in any line.

Another object is to provide a control circuit embodying a stop and start switch for closing a magnetic switch and a solenoid for breaking the control circuit.

Another object is to provide a simple and efficient electrical control unit which may be readily applied to existing installations with a minimum of change.

Other objects and advantages of the invention will be apparent from the following description taken in conjunction with the accompanying drawing showing a wiring diagram of a three wire supply with control switches embodying the present invention.

Briefly stated, the present invention relates to a main solenoid operated control switch in which the supply of current to the solenoid comes from two lines on the load side of the fuses of a three-phase supply of alternating current and a second solenoid operated switch arranged with its switch contacts in series with the first solenoid. The solenoid of the second solenoid operated switch is connected between the fuse contacts of the load and line side of the third fuse so that in the event any one of the fuses is blown due to an overload or other cause the first solenoid will be de-energized and the switch will be open. Suitable starting and stopping switches are provided and a holding switch is also provided for controlling the operation of the main solenoid operated switch.

Referring more particularly to the drawing, a three-phase supply of electric current is received through supply lines 10, 11 and 12 and is supplied to fixed contacts which are closed by a manually operated switch 13 which is connected to line contacts 14, 15 and 16 of fuses 17, 18 and 19, respectively, the load side of said fuses being connected to contacts 20, 21 and 22 in a conventional manner which are connected to leads 23, 24 and 25, respectively, which are connected to line contacts 26, 27 and 28, respectively, of a solenoid operated switch. The other or load contacts 29, 30 and 31 are connected by leads 32, 33 and 34, respectively, to a load shown as a three-phase motor 35. The pairs of contacts 26, 29 and 27, 30 and 28, 31 are bridged, respectively, by movable contact bars 36, 37 and 38, mounted on a movable insulated member 39 which is moved by a solenoid 40 from the open position shown to a position closing the circuits by said contacts when the solenoid 40 is energized, the insulating member 39 with contact bars thereon being normally drawn away by a spring or the like 41.

The solenoid 40 is supplied with electrical power from the lead 23 by means of a lead 42, the circuit being completed from solenoid 40 by a lead 44 connected to spaced contacts 45, 46 the contact 45 being bridged by a contact bar 47 to a contact 48 connected to a lead 49 to a contact 50 of a normally open starting switch having a movable contact bar 51 which may be operated to bridge from contact 50 to a contact 52, contact 52 connected by a lead 53 to a contact 54, the contacts 54 and 46 being bridged by a contact bar 55 which may be the same bar as contact bar 47 or separate therefrom.

Assuming that the starting switch contact bar 51 has been actuated to bridge contacts 50 and 52, the circuit is closed from lead 23 through lead 42 to solenoid 40 and through lead 44, contact 45, contact bar 47, contact 48, lead 49, contact 50, starting switch contact bar 51, contact 52, through lead 56 to contact 57 which is normally engaged by contact bar 58 which bridges contact 57 and a contact 59 and through lead 60, contact 61, contact bar 62 of a second solenoid controlled switch, controlled by normally de-energized solenoid 63 completing the circuit through contact 64 and lead 65 to lead 24. The solenoid 63 when energized separates bridging contact bar 62 from contacts 64 and 61.

However, immediately upon the closing of starting switch 51, the solenoid 40 is energized urging insulating member 39 to carry the contact bars thereon to close the main switch and to move contact bar 55 into engagement with contacts 46 and 54, thereby providing a holding circuit to continue to energize solenoid 40, the circuit being completed from lead 44 of solenoid 40 to contact 46, contact bar 55, contact 54, lead 53, lead 56, contact 57, stop switch contact bar 58, contact 59 to lead 60 to contact 61, contact bar 62, contact 64, and lead 65 to lead 24.

It will be understood that contact bars 47 and 55 may be secured together by an intermediate spacer of insulating material 65A and such composite contact corresponds to a blade of a single-pole double-throw switch and is mechanically attached to the insulating member 39 so as to be movable therewith. Such mechanical connection may take the form of a spring 65B connecting said contact bars 47 and 55 to insulating member 39 and to provide for any lost motion to avoid complications in manufacture of the structure. It is therefore believed to be apparent that when the insulating member 39 is in its inoperative position the contact bar 47 bridges contacts 45 and 48 and that when the insulating member 39 carries its contact bars to close the main line circuits, the contact bar 55 completes a circuit through contacts 36 and 54 simultaneously opening the circuit between contacts 45 and 48 by the withdrawal of contact bar 47 therefrom.

From the above description it is believed that the operation of the present invention should be apparent to one skilled in the art. Normally, when motor 35 is de-energized, the switches are in the position shown and upon bridging the contacts 50 and 52 with starting contact bar 51, the main switch is closed by energization of solenoid 40 and the contact bar 55 bridges contacts 46 and 54 providing a holding circuit through the stop switch contact bar 58, and the second solenoid controlled contact bar 62 to the lead 24 of line 11.

Assuming the motor to be supplied with current and the switches closed in the operation of the motor, if failure should occur by fuses 17 or 18 burning out, the supply of current to solenoid 40 will be immediately interrupted de-energizing the solenoid. In the event that fuse 19 should burn out, current could not flow in lead 25 but solenoid 63 being connected by a lead 66 to contact 22 on the load side of fuse 19 and by a lead 67 to contact 16 on the power side of the fuse 19, current would flow through solenoid 63 to the load. When fuse 19 is burned out there would necessarily be a closed circuit which would normally draw current from contact 16 through contact 22 through any available path and such a path would include lead 67, solenoid 63 and lead 66 which would immediately energize solenoid 63 thereby withdrawing contact bar 62 from contacts 64 and 61, thereby opening the circuit to solenoid 40 and permitting spring 41 to withdraw insulating member 39 and the contact bars thereon opening all leads to the motor.

Consequently, with the present invention there is no danger that the motor 35 could be energized by only two lines of the three-phase system since failure of any one of the fuses 17, 18 or 19 would result in opening the main switch and stopping the motor and the motor could not be thereafter operated until the trouble was corrected.

If desired, a handle 68 may be provided on the insulating bar 39 so that the main switch could be manually closed if desired, thereby permitting the operation of the main switch to be performed electrically by starting switch 51 or manually by handle 68.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A power supply control system for a three-phase alternating current electric motor comprising a three wire source of power, a manual switch, a fuse arranged between the switch and each load line in series with each supply, a magnetically operated switch between the fuses and the load, a connection from the load end of each fuse to a corresponding contact on said magnetically operated switch, a second series of contacts in said magnetically operated switch connected to the load, three movable contact bars on said magnetically operated switch for closing the corresponding contacts in each line to supply electricity to said load, a magnet for operating said magnetically operated switch, said magnet being supplied with power from the load end of two of said fuses, a normally open starting switch, a normally closed stopping switch, a fourth contact bar connected to said magnetically operated switch and having a first pair of contacts normally bridged by said fourth bar when said magnetically operated switch is open with said contacts being in series with said starting switch, a second pair of contacts for cooperation with said fourth bar and in series with both said starting switch and said stopping switch and normally closed by said fourth bar when said magnetically operated switch is closed, said stopping switch being in series with a normally closed solenoid-operated switch having a pair of contacts with one of said contacts connected to said stopping switch and the other of said contacts being connected to the other of said load lines which supply power to said magnet and said magnetically operated switch, a solenoid for opening said solenoid-operated switch with said solenoid being in parallel with said fuse in said third line whereby said solenoid is normally ineffective as long as the fuse in the third line conducts electricity, but upon blowing of the fuse in said third line a current will be passed through said solenoid opening said solenoid operated switch thereby de-energizing the magnet of said magnetically operated switch.

2. A control unit to prevent supplying electricity from two lines of a three-line system in the event of failure of the supply in any one of the lines comprising a solenoid operated main switch for closing circuits through each line, means to energize said main switch solenoid from two of the lines, a fuse in the third line, a second solenoid connected to each end of the fuse in the third line, a switch controlled by said second solenoid for breaking the circuit to said first solenoid upon energization of said second solenoid upon blowing of the fuse in the third line, a normally closed stopping switch, a contacting switch device mechanically connected to said first solenoid switch for simultaneous operation therewith and closing a circuit when said first solenoid operated switch is closed, said switch controlled by said second solenoid being in a series circuit with said first solenoid, with said normally closed stopping switch, and with said contacting switch device, said series circuit being of unbroken continuity when said first solenoid operated switch is closed and said fuse is conducting.

3. A control unit for use with a fused three-wire supply of current having a fuse in each wire comprising a solenoid controlled main switch for series connection with said fuses to a supply to connect said supply of current to a load, a second solenoid controlled switch with the switch thereof in series with said first solenoid and being normally closed when said second solenoid is de-energized, means to connect said second solenoid to the load and the supply end of one fuse, the first solenoid being supplied with power from the load end of the other two fuses, a manually operable normally closed stopping switch having one of its contacts connected to one contact of said switch controlled by said second solenoid, a normally open starting switch having one contact connected to the other contact of the manually closed stopping switch, a single pole double throw two position switch the blade of which is mechanically connected to the main switch for simultaneous operation therewith, said blade being electrically connected to one lead of said first solenoid, one contact of said single pole double throw switch being electrically connected to the other contact of said stopping switch and to said one contact of the starting switch, the other contact of said single pole double throw switch being connected to the other contact of said starting switch, the other contact of said switch controlled by said second solenoid being connected to the load end of one of said other two fuses, whereby said main switch will be opened in the event of blowing of any fuse.

4. A safety switch control for three-phase electric current for driving a motor to prevent one phase operation in the event of failure of the load in any one phase comprising a three wire, three-phase source of power, a manual switch located between the source of power and the load for making and breaking the circuit for each wire, a fuse positioned between the load contact of the manual switch and the load for each of the three wires, a first solenoid operated switch between the load side of said fuses and the load for making and breaking the circuit for each of the three wires, a first solenoid for operating said first solenoid operated switch, a permanent lead extending from the load end of one fuse to one lead of the first solenoid for operating said first solenoid switch the second lead from said first solenoid to the load end of a second fuse including in its circuit, a second normally deenergized solenoid operated switch, said second solenoid operated switch being normally closed for energization of said first solenoid, a second solenoid for operating said second operated switch, one lead from said second solenoid being connected to the load end of said third fuse and the other lead of said second being connected to the supply end of said third face, a lead extending from one contact of said second solenoid operated switch to the load end of the second fuse, a single pole double throw switch operated by said first solenoid when the first solenoid switch is operated, the blade of said single pole double throw switch being connected to the other lead of said first solenoid, a normally closed manually operated stopping switch, a normally open manually closed starting switch, one contact of said starting switch being connected to one contact of said single pole double throw switch, one contact of said stopping switch being connected to the other contact of said second solenoid switch, the other contact of said starting switch and the other contact of said stopping switch being connected together and to the other contact of said single pole double throw switch whereby the blade of said single pole double throw switch is closed with its first contact when the first solenoid switch is open and the blade of the single pole double throw switch is in contact with its other contact when the first solenoid switch is closed.

References Cited in the file of this patent

UNITED STATES PATENTS

| | | |
|---|---|---|
| 1,134,752 | Leonard | Apr. 6, 1915 |
| 1,309,027 | Gilliett | July 8, 1919 |
| 1,530,929 | Brobst | Mar. 24, 1925 |
| 1,660,965 | Hartzell | Feb. 28, 1928 |
| 1,809,827 | Bower | June 16, 1931 |
| 2,389,613 | Anthony | Nov. 27, 1945 |